United States Patent
Barilovits

(10) Patent No.: US 7,130,582 B2
(45) Date of Patent: Oct. 31, 2006

(54) WIRELESS COMMUNICATION SYSTEM

(76) Inventor: Timothy Barilovits, 2110 NW. Flanders St., #1, Portland, OR (US) 97210

( * ) Notice: Subject to any disclaimer, the term of this patent is extended or adjusted under 35 U.S.C. 154(b) by 633 days.

(21) Appl. No.: 10/300,172

(22) Filed: Nov. 19, 2002

(65) Prior Publication Data

US 2004/0097251 A1    May 20, 2004

(51) Int. Cl.
*H04B 7/00*  (2006.01)
(52) U.S. Cl. .................. 455/41.2; 455/507; 455/567; 379/88.24
(58) Field of Classification Search ........... 455/41.2, 455/507, 567; 379/88.24
See application file for complete search history.

(56) References Cited

U.S. PATENT DOCUMENTS

| 6,456,958 | B1 | 9/2002 | Xydis | |
|---|---|---|---|---|
| 2002/0132584 | A1* | 9/2002 | Izumi | 455/41 |
| 2003/0045235 | A1* | 3/2003 | Mooney et al. | 455/41 |

OTHER PUBLICATIONS

Chandra et al., Wireless Medium Access Control Protocols, IEEE Communications Surveys, Second Quarter 2000, pp. 2-15, IEEE.

* cited by examiner

*Primary Examiner*—Matthew D. Anderson
*Assistant Examiner*—Sanh Phu
(74) *Attorney, Agent, or Firm*—Chernoff, Vilhauer, McClung & Stenzel, LLP

(57) ABSTRACT

A communication link is established between wireless communication devices when an audio tone emitted by a first device is detected by a second device.

12 Claims, 4 Drawing Sheets

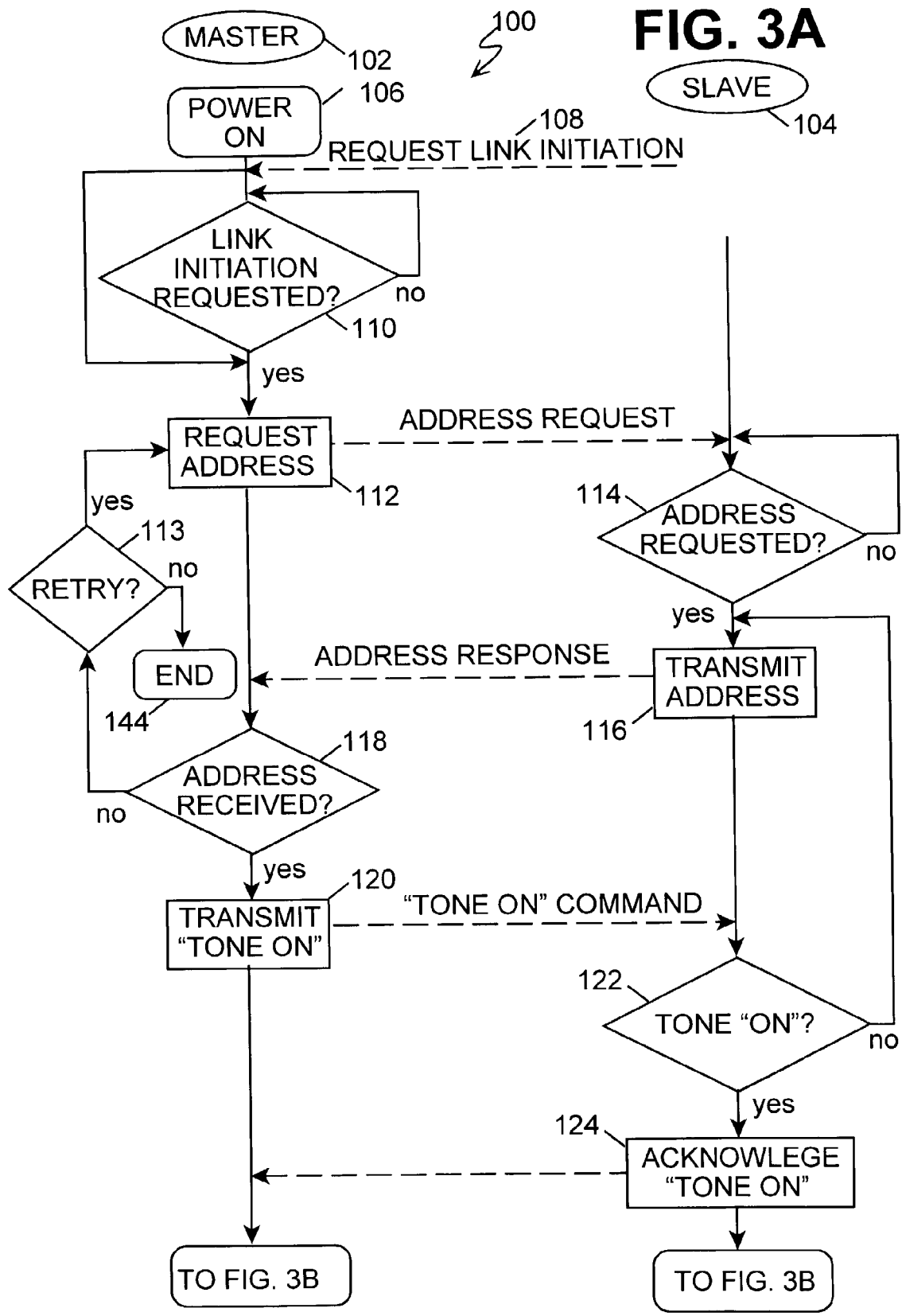

WIRELESS COMMUNICATION SYSTEM

CROSS-REFERENCE TO RELATED APPLICATIONS

Not applicable.

BACKGROUND OF THE INVENTION

The present invention relates to wireless communication systems and, more particularly, to an apparatus and method for establishing a wireless communication network.

Since the success of the Ethernet project in the 1970's, the advantages of digital computing networks have become increasingly apparent. While wired networks have demonstrated the computing advantages of networks, the mobility limitations imposed by the infrastructure of wired networks has motivated the development of wireless local area networks (LANs). Unfettered by conventional wired network connections, wireless network users can move about almost without restriction and access the network from almost anywhere within range of the wireless transceiver. A wireless network may also be more economical than a wired network because of the high cost and difficultly of wiring or rewiring existing structures to connect network nodes when expanding or altering the network. Further, wireless networks offer flexibility that cannot be matched by their wired network counterparts. For example, wireless communication facilitates the creation and termination of transient or ad hoc networks permitting a plurality of mobile data processing devices to establish communication for a purpose and then terminate the communication links at the conclusion of the task. For instance, a group of employees meeting to discuss future product designs or plans can use portable data processing devices to create a wireless network for sharing data and then disband the network when the meeting ends. Similarly, a mobile telephone might be used to establish a temporary wireless network with a vending machine to facilitate electronic payment for a purchase.

Generally, a wireless network may have an infrastructure configuration or an ad hoc configuration. In an ad hoc network, data processing units are brought together "on the fly" so there is no fixed points or structure to the network and, typically, every node is able to communicate with every other node. Algorithms, such as the spokesperson election algorithm, have been designed to elect one of the data processing devices as the base station or "master" controlling operation of the network with remaining devices or nodes being designated as "slaves." Another ad hoc network architecture uses a broadcasting and flooding method to establish a structure for the nodes. On the other hand, the wireless network may have an infrastructure with fixed network access points with which the wireless slave nodes communicate. These network access points may be connected to land lines to bridge the wireless nodes to nodes of other networks, such as the Internet, to broaden the wireless network's scope and capability.

While wireless communication has numerous advantages, the transient nature of wireless networks and the fact that the bounds of the network are limited only by the strength of the radio signal used for communication presents unique problems, particularly when used for a localized network. There is no wiring to define membership in the wireless network and no physical method of preventing a device within radio range from joining the network. For example, when two devices conforming to the Bluetooth wireless communication standard come within radio range of each other, an electronic conversation is automatically initiated to determine whether there is data to be shared and whether one of the devices needs to control the other. Once the conversation has taken place, the communicating devices can automatically form a network known as a personal area network or piconet and initiate data transfer. Bluetooth devices transmit a one milliwatt signal that limits the range to approximately ten meters, reducing the chances of interference between the Bluetooth device and other electronic devices such as portable telephones or television.

However, even with low power, the radio frequency signals used for network communications can penetrate the walls of a structure. While this may make the signal useful for controlling devices located in different rooms or even different buildings, the ability of radio frequency signals to penetrate the walls of a structure also makes it difficult to limit geographic extent of and access to a wireless network and control interference from other nearby wireless communication devices. Wireless networking, more than any other network technology, requires an access control mechanism.

What is desired, therefore, is a system that facilitates the establishment of reliable, localized wireless communication networks having controlled access.

BRIEF DESCRIPTION OF THE DRAWINGS

FIG. 3A is a flow diagram of network initiating communications between nodes of a wireless communication system.

DETAILED DESCRIPTION OF THE INVENTION

Figure 1:
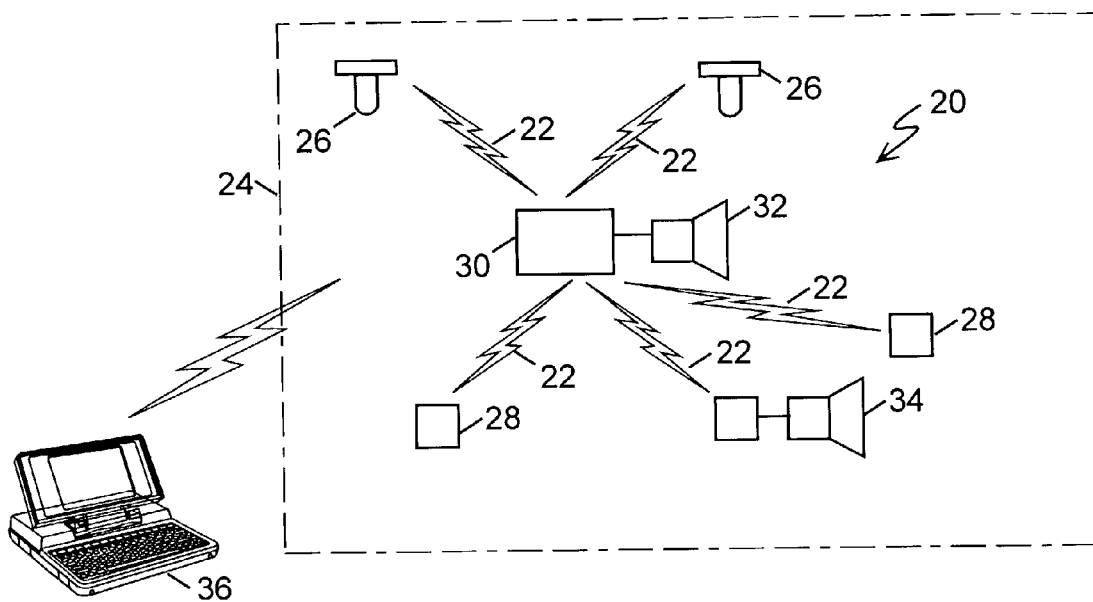
FIG. 1 is a schematic illustration of an exemplary wireless communication network.

Referring in detail to the drawings wherein similar parts of the invention are identified by like reference numerals and, more particularly to FIG. 1, a wireless network 20 comprises a plurality of nodes connected by wireless communication links 22. The exemplary wireless network 20 comprises a plurality of nodes arranged strategically to provide fire protection for a structure 24. The nodes of the network 20 comprise, generally, one or more fire detectors 26 and output transducers 28 communicating with a central controller 30 over the wireless communication links 22. The fire detector nodes 26 typically sense smoke, heat, or another indicia of fire and signal the central controller 30 if a fire is detected. In response, the central controller 30 will sound an alarm 32 and transmit signals to control the operation of one or more of the wireless output transducers 28. By way of examples, an output transducer 28 may be used to sound a remote alarm 34, control the operation of fire suppression equipment, or control power to a piece of equipment within a facility. Wireless communication between the nodes of the exemplary fire protection system 20 can greatly simplify the installation of a fire protection system in an existing structure by eliminating the need to wire each of the remote detectors 26, and output transducers 28 to the central controller 30.

While the exemplary network 20 includes an infrastructure in the form of a central controller 30, the network could have an ad hoc topology with no predesignated central control node. Wireless network nodes are commonly capable of automatic device discovery and initiating a communication link. Wireless devices that have established communication, may use a spokesperson elect algorithm or other algorithm to establish control over peer-to-peer communication in an ad hoc network.

Whether the network has an infrastructure or is an ad hoc network, there may be other wireless devices 36 in the vicinity which may attempt to communicate with the nodes of the fire protection system 20, potentially interfering with its operation. Since wireless devices typically communicate with radio frequency signals that are capable of penetrating the walls of a structure, the range of a wireless transmitter is limited only by its signal power. Reducing crosstalk and interference from physically adjacent wireless devices is important to reliable communication between the nodes of the exemplary network 20 and the proper functioning of the fire protection system. Controlling access to the network and reducing interference is particularly important when the network has limited geographic extent, such as the fire protection network, because of the likelihood that other wireless communication devices will be within radio range of the network's nodes. The inventor concluded that a wireless communication system incorporating audio signaling during network initiating communications would promote control over the extent of the network, encourage reliable communication between the nodes of the resulting network, and reduce the likelihood of interference and crosstalk with other co-located wireless devices.

Figure 2:
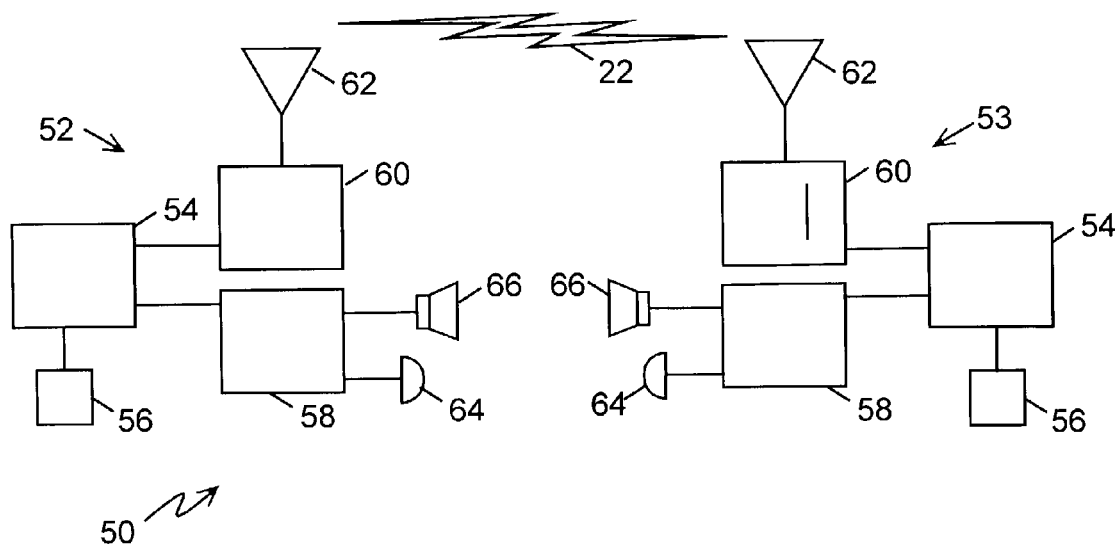
FIG. 2 is a block diagram of a plurality of exemplary nodes of a wireless communication network.

Referring to FIG. 2, a node 52, 53 of a wireless network 50 according to the present invention comprises a data processing unit 54 including data storage 56 and having a signaling connection to an audio processor 58 and a radio frequency transceiver 60. The radio frequency transceiver 60 is connected to at least one antenna 62 for emitting and detecting radio frequency (RF) signals. The audio processor 58 controls and processes signals from an audio detector 64, such as a microphone, that can convert sound to electrical signals and an audio tone emitter 66, such as a speaker that converts electrical signals to audio tones. Only one of the audio tone detector 64 and emitter 66 may be required at certain nodes. A wireless network 50 is formed when two nodes 52, 53 establish communication with each other.

Figure 3B:
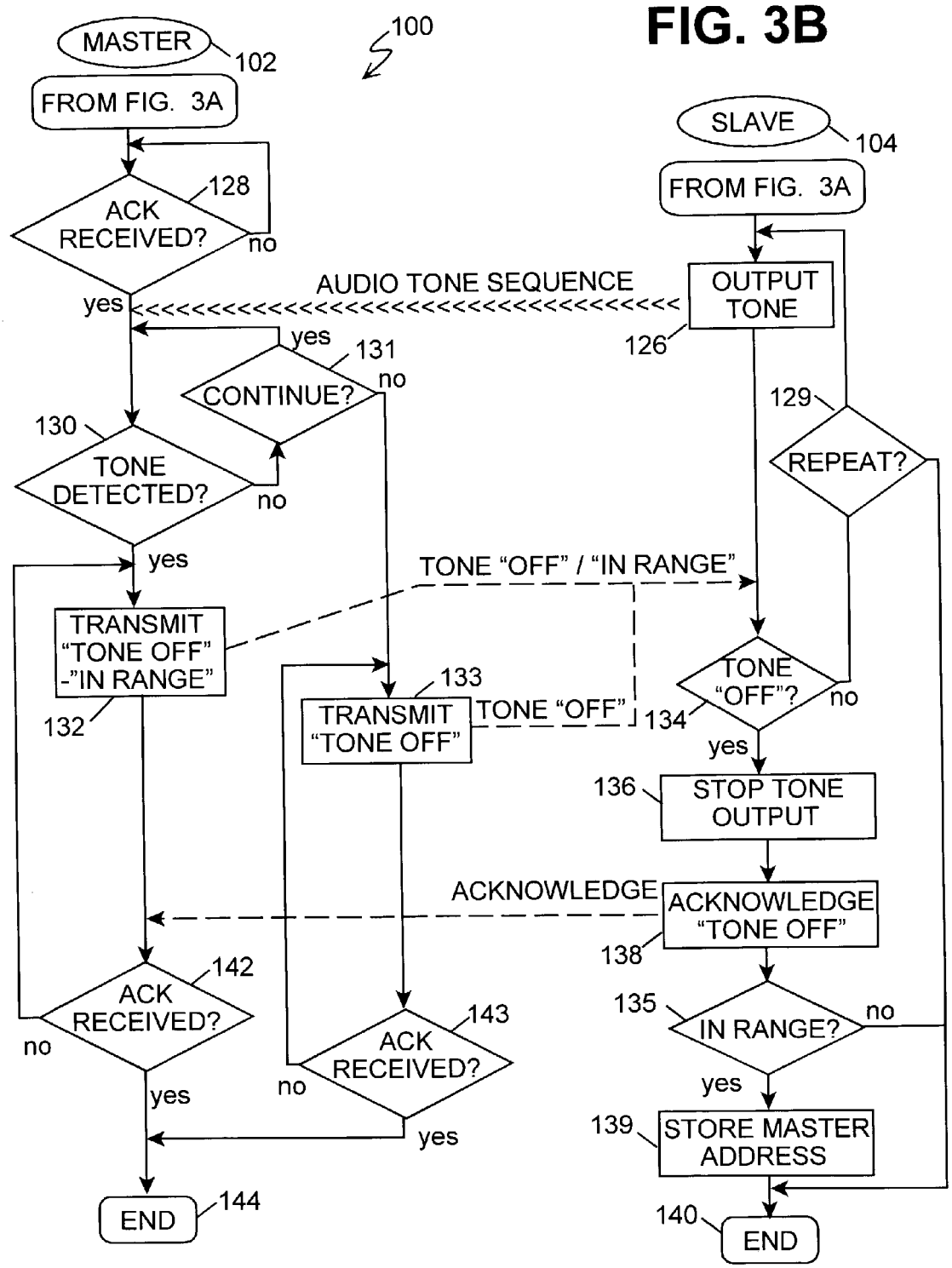
FIG. 3B is a continuation of the flow diagram of network initiating communications of FIG. 3A.

The nodes 52, 53 of the wireless network 50 are capable of automatic discovery and network initiation. Referring to FIGS. 3A and 3B, device discovery and initiation of a network communication link are the result of execution of program instructions by the data processing units 54 of the potential network nodes producing a series of communications between the potential nodes of the network. In the case of a network with a central controller, the potential nodes of the network are the predesignated master 102 and the slaves 104 of the potential network. In the case of an ad hoc network, the communication link may be established between first and second peer nodes with further communication between the nodes to negotiate control of the resulting network.

The communication link initiation process 100 is initiated when the master is powered up 106 or when a potential slave broadcasts a request for link initiation from its RF transceiver 108. When the master 102 is energized 106 or when the master detects a link initiation request 110, the master broadcasts a request for an address 112 to all wireless devices within range of its RF transceiver 60. Each device has a unique address, for example, a 64-bit number, that is assigned to the particular device. If a transmitted data packet contains a device address in a destination address field, the packet is "unicast" to the particular device identified by the address. On the other hand, a node may broadcast a data packet to all nodes in radio range by including a broadcast address in a destination address field of the transmitted data packet. Typically, in either the broadcast or unicast mode, the transmitted data packets include the address of the sender so that the receiver can compare or add the transmitting address to a list of network node addresses stored in the memory 56 by the data processing unit.

A slave 104 receiving the address request 114 at its transceiver, responds by transmitting its address in a unicast addressed to the master 116. Master continues to transmit the address request 112 until it receives an address in response to its request 118 or a period for receiving an address has elapsed 113. In response to receipt of an address 118, the master 102 unicasts a "tone on" command 120 to the slave 104 having the particular address. The slave continues to transmit its address 116 until the "tone on" command is received 122. When the slave 104 receives of the "tone on" command 122, the data processing unit 54 causes the transceiver 60 to transmit an acknowledgment 124 to the master 102 and signals the audio processor 58 to output a signal that, in turn, causes an audio tone sequence to be emitted 126 by the audio tone emitter 66 until a "tone off" command is received from the master or until the tone sequence has been repeated 129 a specified number of times.

When the master receives the acknowledgment 128, the data processing unit of the master 102 directs the audio processor 58 to monitor the audio detector 64 for the audio tone sequence 130. The tones of the audio tone sequence may be a fixed or randomized series of tones separated by periods of "no tone" of fixed or random lengths. Randomizing the series of tones reduces the possibility of aliasing if two links are being established within a short period of time. Several criteria can be used to determine detection of the audio tone sequence including a voting scheme to determine if a majority of the tones of the sequence have been detected. The audio processor continues 131 to monitor the audio detector for the tone sequence until a specified period elapses. If an audio tone sequence is not received, the data processing unit of the master causes a "tone off" message to be transmitted to the slave 133 to terminate the audio tone sequence. If the audio tone sequence is detected 130, the master 102 transmits a radio frequency "tone off" and "in range" message 132 to the slave 104.

In response to receiving "tone off" message 134, the data processing unit 54 of the slave 104 signals the audio processor 58 to stop generating the tone sequence and causes the RF transceiver to transmit an acknowledgment of the "tone off" message to the master 136. If the tone off command from the master 102 was accompanied by the "in range" message 135, the data processing unit 54 of the slave stores the address of the master in memory 56 in a list of device addresses of network nodes 139 from which it will accept commands in the future and terminates the slave's link initiation activity 140. The master's link initiation program ends 144 when the master receives the acknowledgment of the appropriate "tone off" message from the slave 142, 143.

Figure 4:
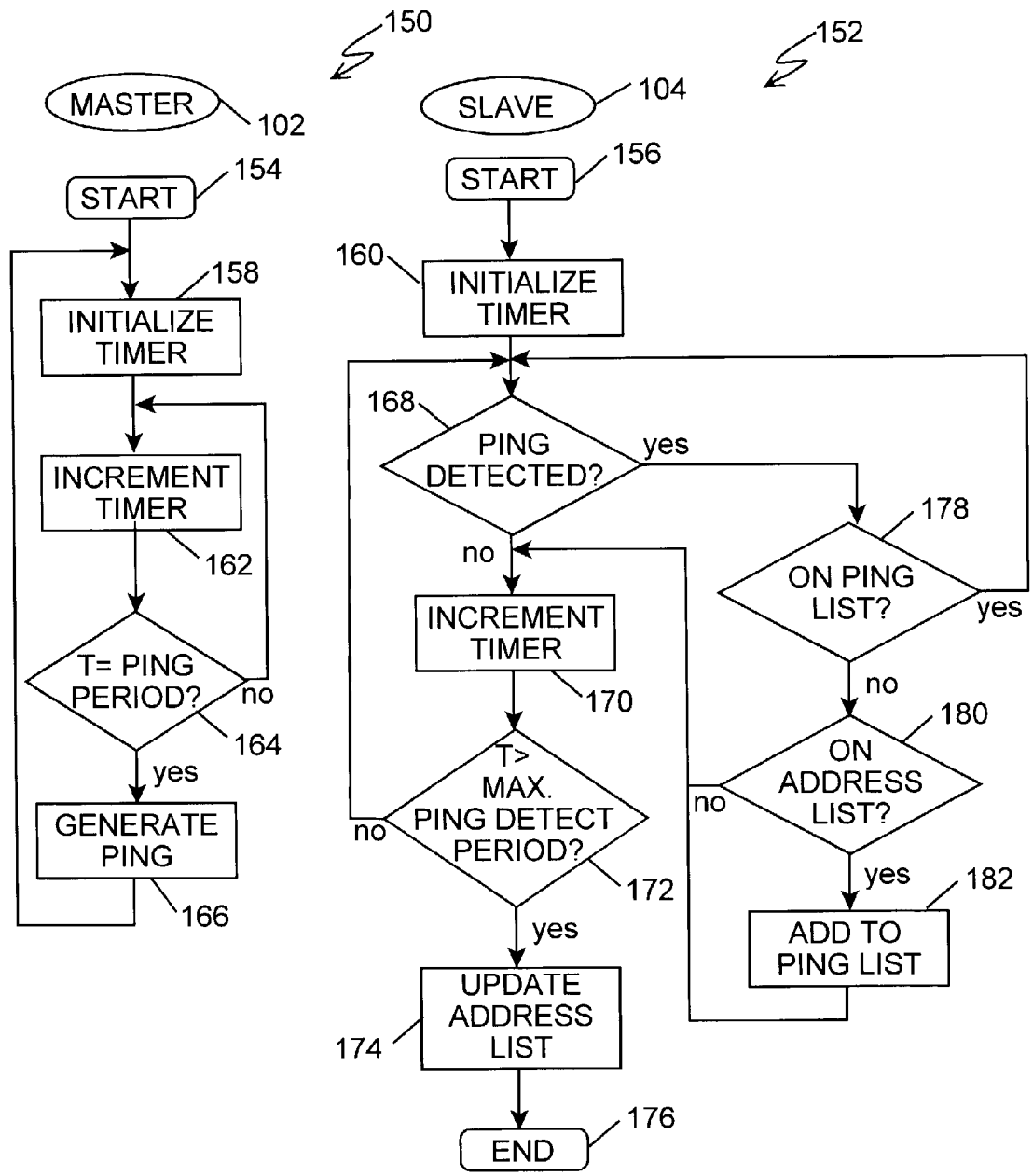
FIG. 4 is a flow diagram of network maintenance communications between network nodes.

When a communication link has been established, the data processing units of the master 102 and the slave 104 initiate 154, 156 execution of link maintenance program instructions 150, 152 respectively, as illustrated in FIG. 4 to periodically affirm the continued viability of the link. The master 102 initializes a timer 158. The data processing unit of the master 102 increments the timer 162 and compares the elapsed time to a predesignated "ping" period 164. If the "ping" period has not elapsed, the timer is again incremented 162 and the elapsed time is again compared to the ping period. If the ping period has elapsed 164, the data processing unit signals the transceiver 60 to broadcast a "ping," an RF signal including the address of the master, and, then, reinitializes the timer 158 to begin timing the next "ping."

When the link maintenance program 152 of the slave 104 is initiated 156, the data processing unit of the slave 104 initializes a ping detection timer. The data processing unit 54 of the slave 104 monitors the transceiver 60 to detect a ping output by another device 168. When a ping is detected, the address of the sender is compared to the addresses of devices stored in a ping list 178. If the address of the device transmitting the ping is already on the ping list 178, the slave continues to monitor the transceiver 60 for the next ping 168.

If the address of the device transmitting the ping is not on the ping list, the data processing unit checks the slave's 104 address list 180 to determine if the address of the transmitting device is included in the address list indicating a communication link has been established with the transmitting device. If the address of the device transmitting the ping not already included on the ping list 178 but is included in the address list 180, the address of the transmitting device is added to the ping list and the timer is incremented 170. If the address of the transmitting device is not on the address list 180, the timer is incremented 170.

When the timer is incremented 170, the elapsed time since the last detected ping is compared to a designated maximum ping detection period 172. The maximum ping detection period is typically substantially longer than the ping period of the master 102 and, preferably, is at least twice the ping period of the master. A ping detection period longer than the ping period of the master avoids a need to synchronize the output of the ping by the master and the detection of pings by the slave. If the elapsed time does not exceed the maximum ping detection period, the data processing unit 54 of the slave continues to monitor the transceiver 60 for a ping. If the time since detection of the last ping exceeds the maximum ping detection period 172, the address list is updated 174 by comparing the addresses on the ping list to the addresses on the address list and deleting from the address list the address of a master from which a ping has not been received within the maximum detection period. Removal of a device from the address list terminates the communication link and the link maintenance program 176 as to that device.

Since audio signals are much less likely to penetrate structure, the incorporation of audio signaling in the network communication link initiation and maintenance processes controls the geographic extent of the resulting network, promotes reliable communication over the longer range RF communication system, and reduces crosstalk and interference from other wireless devices communicating with RF signals.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of establishing a wireless communication link between a first data processing unit and a second data processing unit, said method comprising the steps of:
    (a) transmitting a first command from said first data processing unit to said second data processing unit, said first command directing said second data processing unit to emit an audio tone;
    (b) said second data processing unit wirelessly emitting said audio tone in response to receipt of said first command; and
    (c) if said audio tone is detected by said first data processing unit, transmitting a second command from said first data processing unit to said second data processing unit; and
    (d) in response to receipt of said second command, identifying said first data processing unit as a node of said communication link for said second data processing unit.

2. The method of claim 1 further comprising the steps of:
    (a) said first data processing unit broadcasting a request for an identification of at least one other data processing unit;
    (b) transmitting an address from said second data processing unit to said first data processing unit in response to said broadcast, said address identifying said second data processing unit; and
    (c) transmitting said first command from said first data processing unit in response to receipt of said address identifying said second data processing unit.

3. The method of claim 2 wherein said request for identification is broadcast by said first data processing unit when power is applied to said first data processing unit.

4. The method of claim 2 wherein said request for identification is broadcast by said first data processing unit in response to receipt of a request for initiation of a communication link transmitted by another data processing unit.

5. A method for establishing a communication link between a first data processing unit and a second data processing unit, said method comprising the steps of:
    (a) transmitting a first command from said first data processing unit to said second data processing unit, said first command directing said second data processing unit to emit an audio tone:
    (b) said second data processing unit emitting said audio tone in response to receipt of said first command; and
    (c) if said audio tone is detected by said first data processing unit, transmitting a second command from said first data processing unit to said second data processing unit;
    (d) terminating generation of said audio tone in response to receipt of said second command by said second data processing unit;
    (e) storing an address of said first data processing unit as a node for said communication link; and
    (f) transmitting an acknowledgment of receipt of said second command from said second data processing unit to said first data processing unit.

6. A method of establishing a communication link between a first data processing unit and a second data processing unit, said method comprising the steps of:
(a) broadcasting a request from said first data processing unit for an identification of at least one other data processing unit;
(b) transmitting an address from said second data processing unit to said first data processing unit in response to said request for identification;
(c) transmitting a "tone on" command from said first data processing unit to said second data processing unit;
(d) in response to receipt of said "tone on" command, said second data processing unit transmitting a first acknowledgment to said first data processing unit and emitting an audio tone;
(e) monitoring an audio tone detector of said first data processing unit in response to receipt of said first acknowledgment;
(f) transmitting a "tone off" command from said first data processing unit to said second data processing unit in response to detection of said audio tone; and
(g) said second data processing unit storing an address of said first data processing unit as a node for said communication link in response to receipt of said "tone off" command.

7. A wireless communication device comprising:
(a) a data processing unit;
(b) an audio tone detector to detect an audio tone wirelessly communicated to said audio detector, said audio tone detector controlled by said data processing unit;
(c) a program instruction for execution by said data processing unit, said program instruction causing said data processing unit to store an identification of another data processing unit as a node of a communication link when an audio tone is detected by said audio tone detector.

8. The wireless communication device of claim 7 further comprising a receiver for detecting a radio frequency signal including said identification of said another data processing unit, said receiver controlled by said data processing unit.

9. The wireless communication device of claim 7 further comprising a transmitter of radio frequency signals controlled by said data processing unit, said transmitter transmitting a radio frequency signal identifying said data processing unit in response to said program instruction.

10. The wireless communication device of claim 7 further comprising an audio tone emitter controlled by said data processing device, said audio tone emitter outputting an audio tone in response to a command from said another data processing unit, said command being detected by said receiver.

11. A wireless communication system comprising:
(a) a first data processing unit having a first identifying address;
(b) a first transceiver for transmitting and detecting a radio frequency signal, said first transceiver being controlled by said first data processing unit to transmit said address and a command to emit an audio tone;
(c) a second data processing unit having a second identifying address;
(d) a second transceiver for transmitting and detecting a radio frequency signal including detecting said command to emit an audio tone, said second transceiver being controlled by said second data processing unit to transmit said second identifying address;
(e) an audio tone emitter controlled by said second data processing unit and generating an audio tone sequence in response to receipt of said command to emit an audio tone by said second transceiver;
(f) an audio detector arranged to signal said first data processing unit if said audio tone is detected; and
(g) a memory arranged to store said first identifying address as a node of a communication link with said second data processing unit, said second data processing unit causing storage of said first identifying address in response to a signal from said first transceiver indicating detection of said audio tone by said audio detector.

12. The wireless communication system of claim 11 further comprising:
(a) a timer controlled by said second data processing unit and measuring a time from a last detection of a signal identifying said first data processing unit; and
(b) a program instruction executable by said second data processing unit, said program instruction causing said second data processing unit to delete said first identifying address from said memory if said period since said last detection of said signal at least equals a maximum period.

* * * * *

UNITED STATES PATENT AND TRADEMARK OFFICE
CERTIFICATE OF CORRECTION

| | | |
|---|---|---|
| PATENT NO. | : 7,130,582 B2 | Page 1 of 1 |
| APPLICATION NO. | : 10/300172 | |
| DATED | : October 31, 2006 | |
| INVENTOR(S) | : Tim Barilovits | |

It is certified that error appears in the above-identified patent and that said Letters Patent is hereby corrected as shown below:

Col.      Line 1      24    "difficultly" should be --difficulty--

Signed and Sealed this

Sixth Day of March, 2007

JON W. DUDAS
*Director of the United States Patent and Trademark Office*